Dec. 4, 1956  D. B. McCLELLAN  2,772,764
GRAIN UNLOADER
Filed Sept. 3, 1953  3 Sheets-Sheet 1
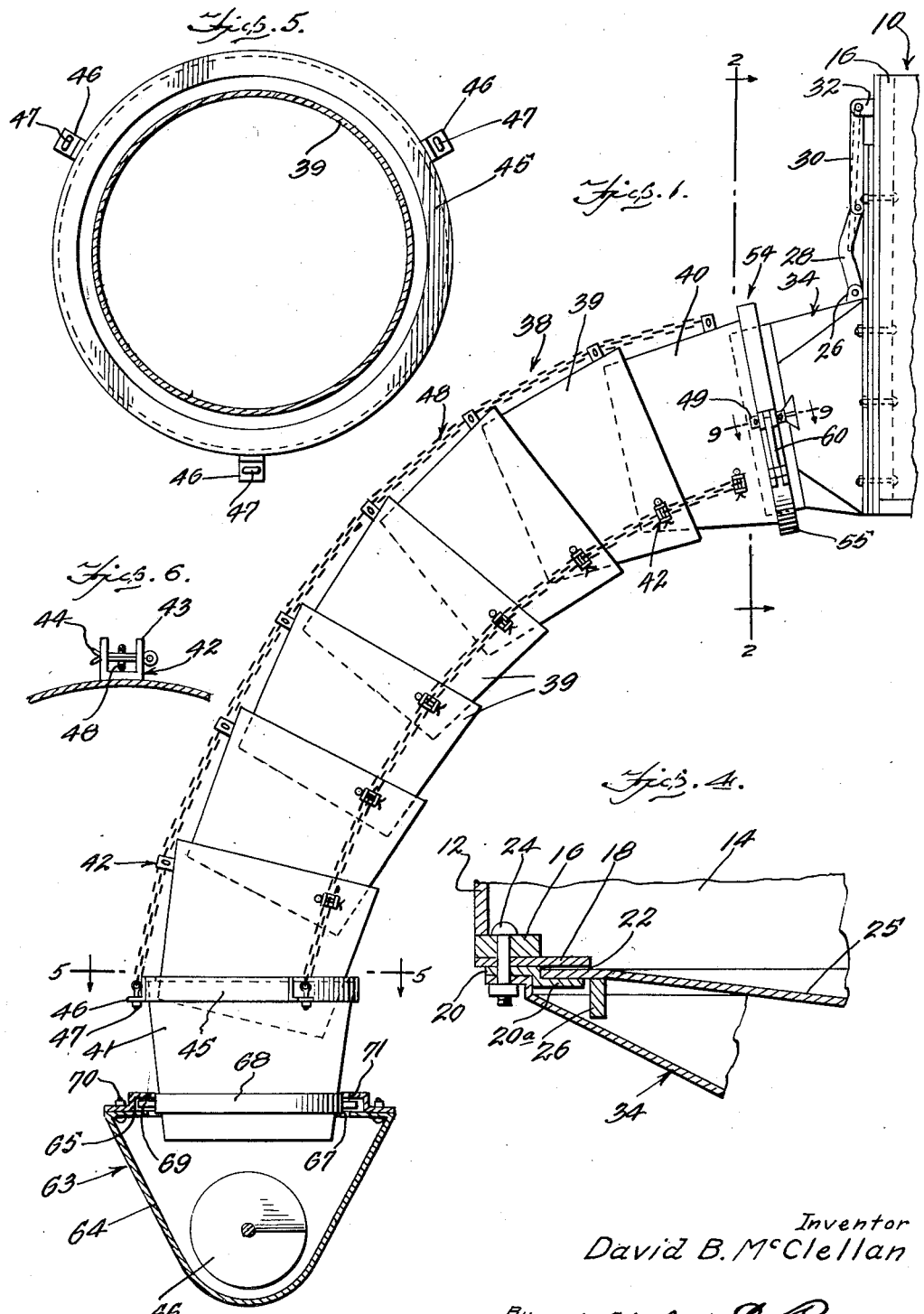
Inventor
David B. McClellan
By Wilfred E. Lawson
ATTY.

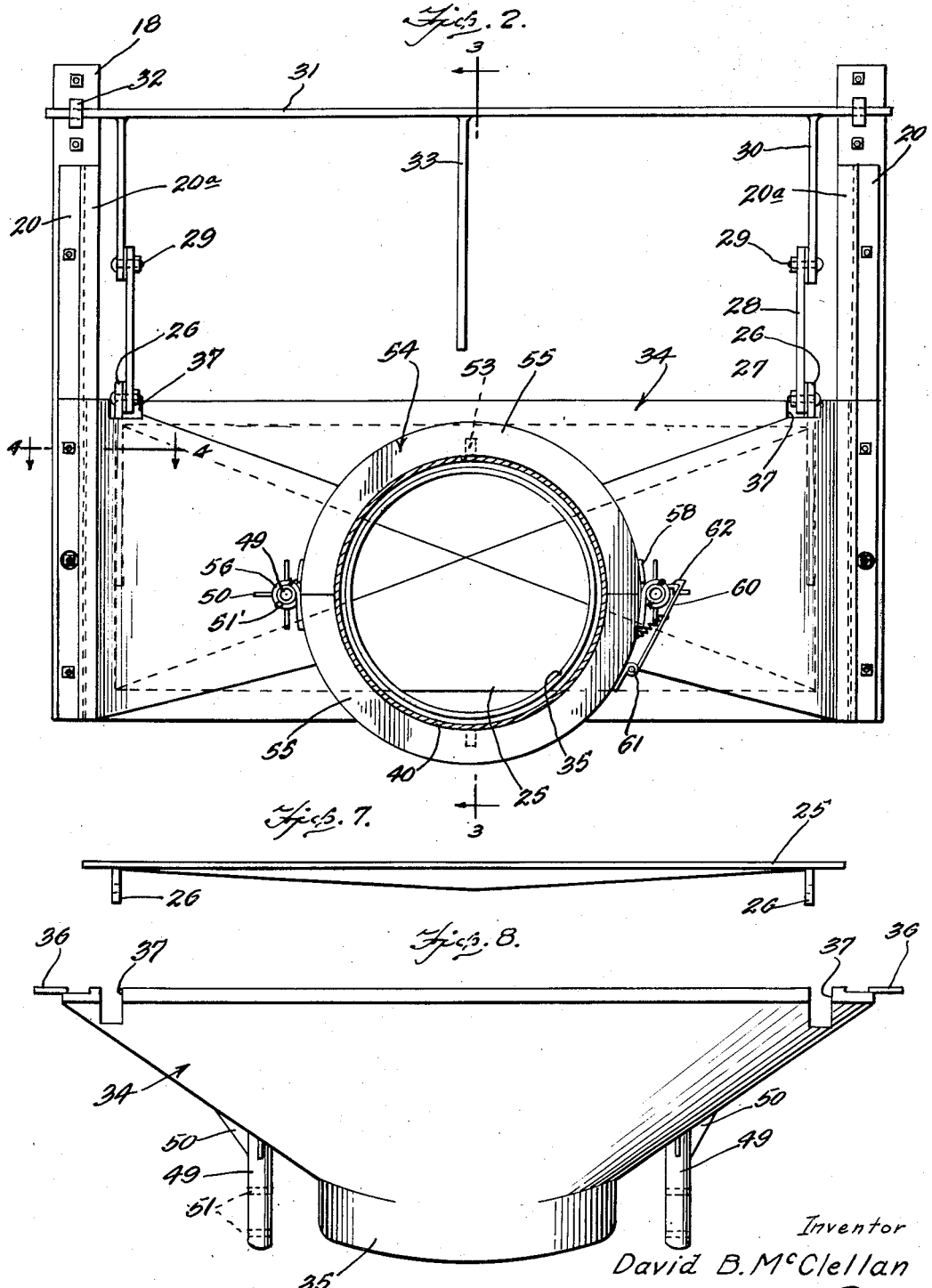

Dec. 4, 1956  D. B. McCLELLAN  2,772,764
GRAIN UNLOADER
Filed Sept. 3, 1953  3 Sheets-Sheet 3
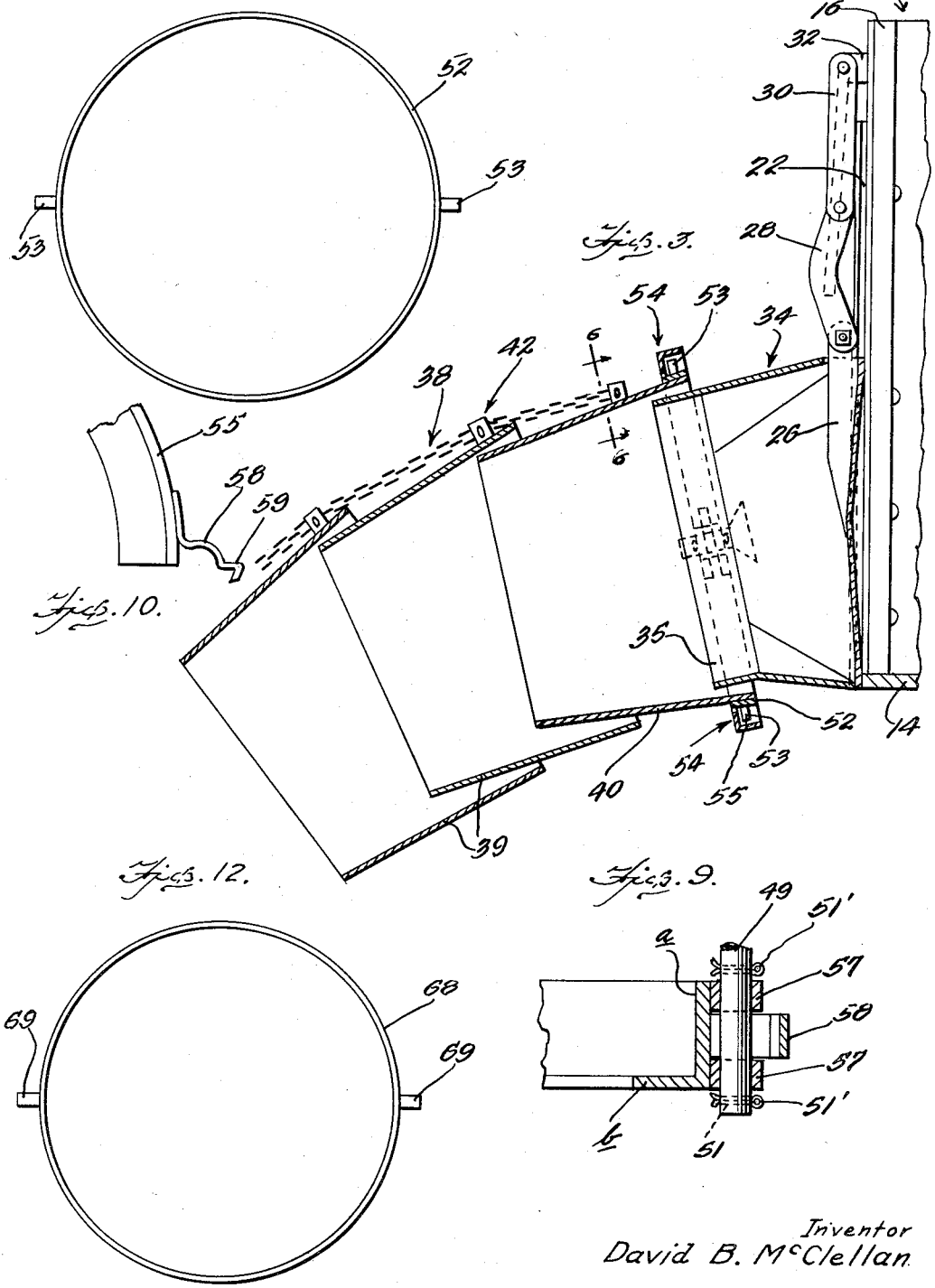
Inventor
David B. McClellan
By Wilfred E. Lawson
ATTY.

United States Patent Office 2,772,764
Patented Dec. 4, 1956

2,772,764

GRAIN UNLOADER

David B. McClellan, Dutton, Mont.

Application September 3, 1953, Serial No. 378,206

1 Claim. (Cl. 193—4)

This invention relates generally to apparatus for loading and unloading a fluent material such as grain and the like and is directed particularly to an improved conduit or pipe structure for such purpose.

A particular object of the present invention is to provide an improved conduit or pipe structure with means for connecting one end to an outlet or discharge nozzle, wherein such pipe structure is designed in a manner to permit easy attachment of the same to such nozzle and is also designed in a plurality of sections whereby it can be turned or directed to any position with a minimum of effort.

Another object of the invention is to provide a novel unloading structure designed to be connected to a hopper or other receptacle such, for example, as the rear end of a truck or wagon, with a novel tail gate unit which functions as a shut off means to prevent the discharge of the grain or other material into the conduit and which can be easily and quickly shifted to an open position to permit such discharge.

A further and more specific object of the invention is to provide a structure of the character stated which comprises a vertically slidable gate member together with a nozzle which is mounted over an opening controlled by the gate and which leads to a cylindrical discharge member, with a multi-unit pipe connected at one end to said cylindrical outlet and having its other end connected with a suitable conveyor structure whereby fluent material may be carried from the wagon or other receptacle to said conveyor structure by which it is moved to a desired storage area.

Still another object of the invention is to provide in a structure of the above described character, a novel means by which said pipe can be easily and quickly attached to or detached from the cylindrical outlet of the nozzle.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawings:

Figure 1 is a view in side elevation of the loading or unloading apparatus of the present invention showing the same connected with a screw conveyor which is shown in transverse section.

Figure 2 is a sectional view taken substantially on the line 2—2 of Figure 1.

Figure 3 is a sectional view taken substantially on the line 3—3 of Figure 2.

Figure 4 is a detail section on an enlarged scale taken substantially on the line 4—4 of Figure 2.

Figure 5 is a sectional view taken substantially on the line 5—5 of Figure 1.

Figure 6 is a detail section taken substantially on the line 6—6 of Figure 3.

Figure 7 is a top edge view of the gate panel.

Figure 8 is a top view of the nozzle, detached from the other elements.

Figure 9 is a detail section taken substantially on the line 9—9 of Figure 1.

Figure 10 is a fragmentary detail illustrating one of the two elements forming the coupling between the separable ends of the attaching collar.

Figure 11 is a plan view of the upper coupling ring carried on the upper section of the pipe unit.

Figure 12 is a plan view of the lower coupling ring carried on the lower section of the pipe unit.

While the present invention is designed to be used in connection with any type of receptacle, bin or the like, its use will be here described in association with a wagon body in the function of a tail gate for such body.

In the drawings the numeral 10 generally designates the rear end portion of such a wagon or truck body, one side wall of which is designated 12 while the bottom is designated 14, it being understood that the rear end of the body is open.

For convenience in mounting the gate across the back end of the truck there are provided at opposite sides two upstanding posts 16.

To the back face of each post 16 the gate and nozzle, hereinafter more fully described, are secured by the means illustrated most clearly in Figure 4 and such means comprises a long flat base plate 18 which is disclosed vertically against the back face of each post and a guide plate 20 which has a rearwardly offset portion 20a which is spaced from the plate 20 to form a vertical guide slot 22.

The guide plate 20 is of less length than the base plate 18 as shown in Figure 2 but has its bottom end flush with the bottom end of the base plate and passing through the posts, base plates and flanges are the securing bolts 24 which also function to hold the hereinafter described nozzle unit in position.

Extending transverse across the space formed between the posts 16 is the tail gate panel 25 which has its opposite vertical edges slidably engaged in the slots 22 so that it may have free up and down movement.

At each side of the gate panel there is fixed to the rear face thereof the vertically disposed rib 26, the top end of which projects above the top of the panel as shown in Figures 2 and 3 to provide a hinge gear.

Pivotally coupled to the upper end of each rib 26 by the bolt 27 is an outwardly bowed link 28 and the opposite or upper end of this link 28 is pivotally attached by a pivot bolt 29 to the free end of a crank arm 30 which has its other end rigidly secured to a shaft 31 which is disposed transversely of the structure above the guide plates 20 as shown in Figure 2.

Above the guide plates 20, each base plate carries the rearwardly extending apertured ear 32 through which an end of the shaft 31 extends and in which such shaft turns when the gate panel is raised and lowered.

To facilitate the turning of the shaft 31 there is provided the lever 33 which extends downwardly as illustrated when the gate panel is in lowered position and as is also clearly shown, when the panel is so lowered the coupled crank arms and links are also in dependent position.

Disposed across the rear side of the gate panel is a nozzle unit which is generally designated 34 and which is substantially frusto-conical in form, the apex portion of which unit is shaped to provide the circular discharge flange 35.

The unit 34 is shaped or formed so that the discharge flange, forming the outlet of the nozzle, is directed downwardly slightly as shown in Figure 3.

Disposed vertically along each side of the nozzle 34 is the mounting flange 36 which is positioned against the guide plate 20 at the outer side of the offset flange portion 20a thereof and which has the securing bolts 24 extended therethrough as shown in Figure 4 so that the nozzle is secured firmly in position.

Adjacent to each flange 36 the body of the nozzle 34 has a forwardly extending slot 37 in its top edge in which the adjacent rib 26 works. Thus it will be seen that the gate panel completely covers and closes the forward end of the outlet nozzle unit, when the panel is in lowered position but when it is elevated by turning the shaft 31, the contents of the wagon body or other receptacle can flow into and through the nozzle into the multi-section flexible pipe unit which is generally designated 38 and which has its upper end section telescoped over the discharge flange and attached thereto in the manner about to be described.

The multi-section flexible pipe unit 38 is made up of a plurality of frusto-conical tubular intermediate sections 39 and the upper and lower or inlet and outlet end sections 40 and 41 which are also of frusto-conical tubular form like the intermediate sections. These end sections are separately identified by the reference numerals 40 and 41 to facilitate the description of the differences between them and between the intermediate sections.

As illustrated the sections of the pipe unit are assembled in partially telescoped relation with the small end of one section entering the large end of an adjacent section and for the purpose of tying the several sections together while permitting complete flexibility of the pipe unit, each section, with the exception of the lower or outlet one 41, has secured to its outer wall adjacent to the larger end thereof three, or any other suitable or desired number, outstanding clevises 42 each of which comprises the two outwardly projecting spaced ears 43 which are apertured to have a cotter key 44 extended transversely therethrough for the purpose about to be described.

The lower or outlet section at the discharge end of the unit, instead of having the clevises 42 has its larger end encircled by a band 45 which carries a number of outwardly projecting ears 46 each of which is apertured to receive an eye bolt 47. There are the same number of ears 46 on the band 45 as there are clevises on each of the sections 39 and the section 40.

The ears 46 and the clevises 42 are equally distantly spaced around their respective pipe sections and when the pipe sections are assembled the clevises and ears are in line lengthwise of the pipe and the clevises of each line and the ears therein are joined together by a flexible coupling strand 48 here illustrated as a link chain, one end of each chain being attached to an eye bolt 47 and the chains passing between the ears of the lined up clevises and having the cotter keys extending through links lying between the ears 43 whereby to couple all the sections together.

For facilitating the attachment of the upper section 40 to the flange 35 of the outlet nozzle 34 there are provided on opposite sides of the discharge flange, the rearwardly extending arms 49 each of which is rigidly joined to the wall of the nozzle as shown in Figure 8 and held firmly against side movement by the bracing gussets 50.

Each arm 49 has two cotter key openings 51 formed transversely therethrough to receive cotter keys 51', see Figure 9, for the purpose about to be described.

Encircling the large end of the top section 40 of the pipe and secured thereto is a coupling ring 52 which carries two dimetrically opposite outwardly extending pivot and retaining pins 53.

The numeral 54 generally designates an attaching collar which is divided into the two semi-circular portions 55.

Two adjacent ends of the collar portions 55 carry interengaging sections of a hinge 56 which encircle one of the arms 49 between the two cotter keys 52 carried by the arm so that such arm functions as a pintle for the hinge whereby the two sections 55 can be swung apart or together to open or close the collar.

The other end of the lower section 55 of the attached collar carries the two spaced rings 57 through which the other arm 49 extends as shown in Figure 9, these rings 57 lying between the two cotter keys 52 as shown. Thus the lower half of the attaching ring is permanently held on and between the arms 49 but the upper half can be swung upwardly to open position by means of the hinge 56 and the other end of this upper half instead of carrying a complete circular or annular member to fit between the rings 57, carries the outwardly and downwardly curving tongue 58, shown in Figure 10, which terminates in the outwardly extending flange 59. This curved portion of the tongue 58 positions over and partly around the arm 49 which the rings 57 encircle, when the upper half of the attaching collar is in closed position.

In order to hold the two halves of the collar together or, in other words, to secure the upper half of the collar in closed position, the lower half of the collar carries, at the end adjacent to the rings 57, the long latching hook 60 which is pivotally attached to the lower half of the collar as indicated at 61 while the upper end of the hook has the inwardly turned bill 62 which engages over the tongue 59 to thus secure the upper half of the collar in position.

The collar 54 is of angular cross section as shown in Figure 9, having the one flange a disposed substantially with the nozzle flange 35 while the other flange of the collar which is designated b extends inwardly toward the flange 35 as is clearly shown in Figure 3.

The inside diameter of the collar flange b is only slightly greater than the diameter of the coupling ring 52 which is carried by the pipe section 40. Thus it will be seen that when the attaching collar is open the large end of the upper section 40 of the pipe can be slipped over the discharge flange 35 across the inner edge of the flange 20 of the lower half of the coupling collar to engage the lower pin 53 behind such flange; after which the upper half of the attaching collar can be closed down and secured by the hook 60 so that the upper pin 53 of the coupling ring will be held behind the flange b of the collar as shown in Figure 3.

The lower or outlet end of the pipe has the section 41 connected with a screw conveyor unit which is generally designated 63. Since the conveyor unit in itself forms no part of the invention aside from the novel means of connecting the end of the pipe with it, no detail illustration has been made to show the length of the unit or the means by which the screw is rotated as it is thought it is sufficient to set forth that such unit comprises a housing 64 having a top wall 65 and enclosing a screw 66.

In accordance with the present invention the pipe is connected in the top wall 65 of the housing, at an end of the conveyor, in the following manner.

The wall 65 of the conveyor is provided with an opening 67 to which the smaller end of the bottom or outlet section 41 is adapted to extend.

This smaller end of the section 41 has secured about it the lower coupling ring 68 which carries two radially outwardly extending pivot and retaining pins 69 which are positioned over top of the wall 65 when the small end of the section 41 is extended through the openings 67.

In order to retain the ring 68 in position, and also the section 41 to which it is attached, the top of the wall 65 has secured thereto by the bolts 70, a flanged ring 71 which overlies the pins 69, the inside diameter of the ring 71 being only slightly greater than the overall diameter of the ring 68 as shown in Figure 1. Thus it will be seen that the conveyor and the outlet end of the multi-section flexible pipe unit are joined together so that they cannot be readily separated without removing the bolts 70, but the conveyor unit 63 can be turned around to any position desired without having to change the position of the end section 41 of the pipe unit.

From the foregoing it will be seen that there is provided by the present invention a novel conduit system by which fluent material such as grain or the like can be readily conveyed from a bin, hopper, wagon or truck body or other source to a desired remote point such as the conveyor structure 63.

When the structure is attached to the rear of a wagon or truck so that the parts 25 and 34 function as a tail gate, such parts can remain as a permanent portion of the truck or wagon and when grain is to be unloaded the inlet end section 40 of the pipe can be easily and quickly coupled to the nozzle flange 35 in the manner described.

As a safety feature it is desired that certain of the cotter keys 44 be made of a material which would yield or break under excessive strain so that in the event that the wagon or truck to which the pipe is attached, moves away from the conveyor without having the pipe detached from the nozzle, the safety cotter keys would break so as to automatically release the pipe. While any of the cotter keys may be used for this purpose it is preferred that the keys connected with the clevises carried by the upper pipe section 40 be selected for this purpose.

While the lower section 41 has been shown and described as having, in place of the clevises 42 shown on the other sections, a hand 45 carrying eye bolts 47, to which the chains are attached, it is to be understood that, while this arrangement may be preferred, the invention is not limited to such ararngement as use may be made here of the clevises if desired.

It is also pointed out that in placing the clevises 42 upon the upper section 40, they should be positioned sufficiently far away from the attaching collar 54, to permit pivotal motion on the axis of the pins 53.

I claim:

A tailgate structure for the open rear end of the body of a vehicle, said body having bottom and side walls, said structure comprising a pair of upstanding posts secured to the rear ends of said side walls, a pair of vertically disposed base plates, each plate abutting the rear face of one post, a pair of guide plates, each guide plate abutting the rear face of one base plate, a rearwardly offset portion on each guide plate to provide with the associated base plate a pair of vertical opposed guide channels, a frusto-conical hood having edge flanges abutting the rear faces of said guide plates, common fastening means extending through said posts, said base plates, said guide plates and said flanges, said hood having an aperture substantially at the apex thereof, an outwardly and downwardly extending flange surrounding said aperture to provide a discharge opening, a generally rectangular gate panel disposed forwardly of said hood and having opposite side edges received in said guide channels for vertical sliding movement to close and open said discharge opening, rearwardly extending spaced ribs on said panel, gate panel operating mechanism mounted on said posts, links pivotally connected to said ribs and said mechanism and spaced notches in the upper edge of said hood for receiving said ribs to permit vertical movement of said panel by said mechanism.

References Cited in the file of this patent

UNITED STATES PATENTS

| | | |
|---|---|---|
| 853,750 | Whorrall | May 14, 1907 |
| 889,023 | Leschinski | May 26, 1908 |
| 913,948 | Gilman | Mar. 2, 1909 |
| 946,969 | Laing | Jan. 18, 1910 |
| 1,417,780 | Stephens | May 30, 1922 |
| 1,486,519 | Hartley | Mar. 11, 1924 |
| 1,782,734 | MacDougald | Nov. 25, 1930 |
| 2,258,203 | Conover | Oct. 7, 1941 |
| 2,486,382 | Bauer | Nov. 1, 1949 |
| 2,496,504 | Tarrant | Feb. 7, 1950 |
| 2,601,608 | Hansen | June 24, 1952 |
| 2,697,510 | Morrison | Dec. 21, 1954 |